US009225162B2

(12) United States Patent
Zhang et al.

(10) Patent No.: US 9,225,162 B2
(45) Date of Patent: Dec. 29, 2015

(54) SYSTEM AND METHOD FOR FAULT PROTECTION

(71) Applicant: General Electric Company, Schenectady, NY (US)

(72) Inventors: Yingqi Zhang, Shanghai (CN); Tao Wu, Nanjing (CN); Fan Zhang, Shanghai (CN); Kunlun Chen, Shanghai (CN)

(73) Assignee: General Electric Company, Schenectady, NY (US)

( * ) Notice: Subject to any disclaimer, the term of this patent is extended or adjusted under 35 U.S.C. 154(b) by 208 days.

(21) Appl. No.: 14/135,613

(22) Filed: Dec. 20, 2013

(65) Prior Publication Data

US 2014/0177120 A1 Jun. 26, 2014

(30) Foreign Application Priority Data

Dec. 20, 2012 (CN) .......................... 2012 1 0557048

(51) Int. Cl.
*H02H 3/08* (2006.01)
*H02H 9/02* (2006.01)
*H02H 3/02* (2006.01)

(52) U.S. Cl.
CPC ............... *H02H 9/021* (2013.01); *H02H 3/025* (2013.01); *H02H 3/08* (2013.01)

(58) Field of Classification Search
CPC .......... H02H 9/02; H02H 9/023; H02H 9/025
USPC ....................................................... 361/93.9
See application file for complete search history.

(56) References Cited

U.S. PATENT DOCUMENTS

| 4,020,395 | A | | 4/1977 | Erickson et al. |
| 4,071,812 | A | * | 1/1978 | Walker .............. H02M 7/53806 363/132 |
| 5,991,171 | A | * | 11/1999 | Cheng ............... H02M 3/33507 363/21.03 |
| 6,040,988 | A | | 3/2000 | Rees et al. |
| 6,331,941 | B1 | | 12/2001 | Smith |
| 6,952,335 | B2 | | 10/2005 | Huang et al. |
| 7,035,066 | B2 | | 4/2006 | Mcmahon et al. |

(Continued)

FOREIGN PATENT DOCUMENTS

EP 2394908 A1 12/2011

OTHER PUBLICATIONS

Chan et al., "Integrated Gate Commutated Thyristor Based Dynamic Voltage Restorer", Power System Technology, 1998. Proceedings. Powercon '98. 1998 International Conference , Issue Date : Aug. 18-21, 1998, vol. 1, pp. 635-638, Print ISBN: 0-7803-4754-4.

*Primary Examiner* — Dharti Patel
(74) *Attorney, Agent, or Firm* — GE Global Patent Operation; Catherine J. Toppin

(57) ABSTRACT

A protection system includes a control module, a switch, and an inductive device. The control module is used to provide control signals and switching signals based at least in part on a detected signal measured by a detecting device. The control signals include a first control signal corresponding to a normal mode and a second control signal corresponding to a fault mode. The switch is switched on and off according to the switching signals. The inductive device is coupled with the switch. The inductive device is controlled to be operated with a first inductance in response to the first control signal provided from the control module and a second inductance in response to the second control signal provided from the control module.

20 Claims, 10 Drawing Sheets

(56) References Cited

U.S. PATENT DOCUMENTS

| | | |
|---|---|---|
| 7,821,753 B2 | 10/2010 | Evans |
| 2006/0083032 A1* | 4/2006 | McDonald ........ H02M 3/33592 363/21.12 |
| 2008/0037293 A1* | 2/2008 | Jacques ............. H02M 3/33553 363/21.03 |
| 2010/0181963 A1* | 7/2010 | Schreiber ................ H02J 7/022 320/108 |
| 2011/0148213 A1 | 6/2011 | Baldwin et al. |
| 2011/0317321 A1 | 12/2011 | Vogel |
| 2012/0243278 A1* | 9/2012 | Zhang .................. H05K 7/1432 363/127 |
| 2013/0093381 A1* | 4/2013 | McGinley ............. H02J 7/0068 320/107 |

* cited by examiner

SYSTEM AND METHOD FOR FAULT PROTECTION

FIELD OF INVENTION

Embodiments of the present invention generally relate to systems and methods for fault protection and, more particularly, for overcurrent fault protection.

BACKGROUND

Direct current (DC) systems are widely used in various fields such as automatic transmission systems, DC micro-networks, and marine systems. In these fields, the DC system usually provides a voltage to multiple loads coupled in parallel. However, an overcurrent fault which may be caused by a short circuit condition, for example, could introduce a cascaded failure to the loads due to the large current in DC bus bars, DC capacitors, and power converters. Overcurrent fault protection is thus one critical challenge for the DC system. Usually a protection system is provided for detecting fault conditions and operating one or more protection devices to isolate the fault area.

Mechanical breakers and fuses are conventionally used in fault protection systems. These components are designed to remove power from an electrical device when an unbearable high current flowing through the electrical device is detected. Opening or tripping a mechanical breaker, however, is not instantaneous and may generate an arc. A fuse is dependent upon an overheating condition which usually lags behind the overcurrent fault and must be replaced each time it is tripped. Some known types of protection systems are configured to allow the fault current to conduct for up to several tens of milliseconds, which may cause a cascaded failure of the electrical device.

Another more recently developed type of protection system is based on a high power semiconductor device such as an integrated gate commutated thyristor (IGCT). Due to the nature of the semiconductor device, the trip time required for isolating the overcurrent fault which may be caused by a short circuit fault may be shortened to several tens of microseconds. However, limiting the fault current flowing through the semiconductor device to a controllable value for repeatable use of the protection system is a challenge.

Therefore, it is desirable to provide systems and methods to address the above-mentioned problems.

BRIEF DESCRIPTION

In accordance with an embodiment of the present invention, a protection system is provided. The protection system includes a control module, a switch, and an inductive device. The control module is used for providing control signals and switching signals based at least in part on a detected signal measured by a detecting device. The control signals include a first control signal corresponding to a normal mode and a second control signal corresponding to a fault mode. The switch is switched on and off according to the switching signals. The inductive device is coupled with the switch and is controlled to be operated with a first inductance in response to the first control signal provided from the control module and a second inductance in response to the second control signal provided from the control module.

In accordance with an embodiment of the present invention, a method for operating a protection system is provided. The method includes providing a first control signal to an inductive device of the protection system to allow the inductive device to be operated with a first inductance when in a normal mode and providing a second control signal to the inductive device of the protection system to allow the inductive device to be operated with a second inductance when in a fault mode.

In accordance with an embodiment of the present invention, a circuit system is provided. The circuit system includes an electrical device, a protection system for the electrical device, and a switch. The protection system includes a control module and an inductive device. The control module is used for providing control signals and switching signals based at least in part on a detected signal measured by a detecting device. The control signals include a first control signal corresponding to a normal mode and a second control signal corresponding to a fault mode. The switch is switched on and off according to the switching signals. The inductive device is coupled with the switch and is controlled to be operated with a first inductance in response to the first control signal provided from the control module and a second inductance in response to the second control signal provided from the control module.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of the present invention.

Unless defined otherwise, technical and scientific terms used herein have the same meaning as is commonly understood by one of ordinary skill in the art to which this disclosure belongs. The terms "first," "second," "third," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items.

As used herein, the terms "may," "can," "may be," and "can be" indicate a possibility of an occurrence within a set of circumstances; a possession of a specified property, characteristic or function; and/or qualify another verb by expressing one or more of an ability, capability, or possibility associated with the qualified verb. Accordingly, usage of "may," "can," "may be," and "can be" indicate that a modified term is apparently appropriate, capable, or suitable for an indicated capacity, function, or usage, while taking into account that in some circumstances, the modified term may sometimes not be appropriate, capable, or suitable. For example, in some circumstances, an event or capacity may be expected, while in other circumstances, the event or capacity may not occur. This distinction is captured by the terms "may," "can," "may be," and "can be".

Figure 1:
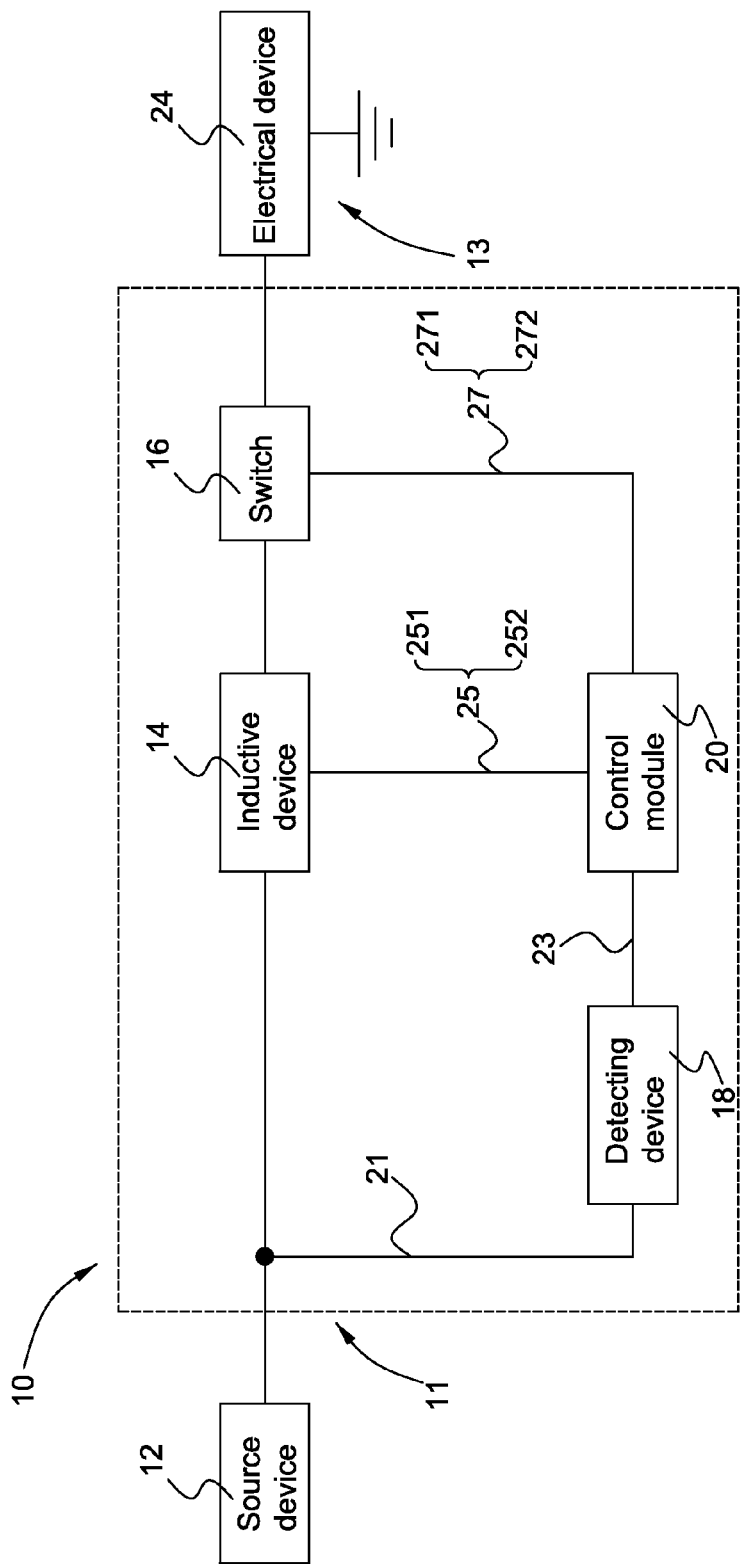
FIG. 1 is a block diagram of a protection system in accordance with an embodiment of the present invention.

FIG. 1 is a block diagram of a protection system 10 in accordance with an exemplary embodiment of the present invention. The protection system 10 is used to protect an electrical device 24 against one or more faults occurring in association with the operation of the electrical device 24. In some embodiments, the one or more faults may include at least one short circuit fault which may occur at a source side 11 where a source device 12 is located for providing power to the electrical device 24 via the protection system 10.

In some embodiments, the short circuit fault may cause an overcurrent (i.e., an electrical current exceeding a normal current value) to flow through the electrical device 24. In some embodiments, the overcurrent may be caused by other faults or abnormal circuit conditions, such as overloading of the electrical device 24 and/or impedance mismatch between the electrical device 24 and the source device 12.

More specifically, in some embodiments, when no overcurrent fault occurs in a normal mode, the protection system 10 is used to conduct a normal current provided from the source device 12 to the electrical device 24. In this embodiment, in order to allow the normal current to flow through the protection system 10 smoothly, the protection system 10 may be operated to have a small or substantially zero resistance or inductance. When an overcurrent fault occurs in a fault mode, the protection system 10 is used to interrupt a fault current provided to the electrical device 24. Under these circumstances, in order to limit a quick rise and a high value of the fault current, the protection system 10 may be operated to have a large resistance or inductance.

In some embodiments, the electrical device 24 receives power from a DC bus, the protection system 10 may be coupled to the DC bus. In some embodiments, the electrical device 24 comprises a DC electrical device such as a DC motor which may be coupled to the DC bus directly. In an embodiments, an AC electrical device such as an AC motor may be coupled to the DC bus indirectly via a DC/AC converter (not shown).

In the illustrated embodiment, the protection system 10 includes a switch 16, an inductive device 14, a detecting device 18, and a control module 20.

The switch 16 is coupled between the source device 12 and the electrical device 24. In one more specific example, as illustrated by FIG. 1, the switch 16 is coupled between the inductive device 14 and the electrical device 24. In another specific example (not shown), the switch 16 may be coupled between the source device 12 and the inductive device 14. The switch 16 may comprise an electrical switch, or more particularly, a semiconductor based electrical switch. The switch 16 can be turned on and off to allow and interrupt current flow on a link between the source device 12 and the electrical device 24. Non-limiting examples of the switch 16 may include an integrated gate commutated thyristor (IGCT), an insulated gate bipolar transistor (IGBT), and any other suitable devices.

Figure 2:
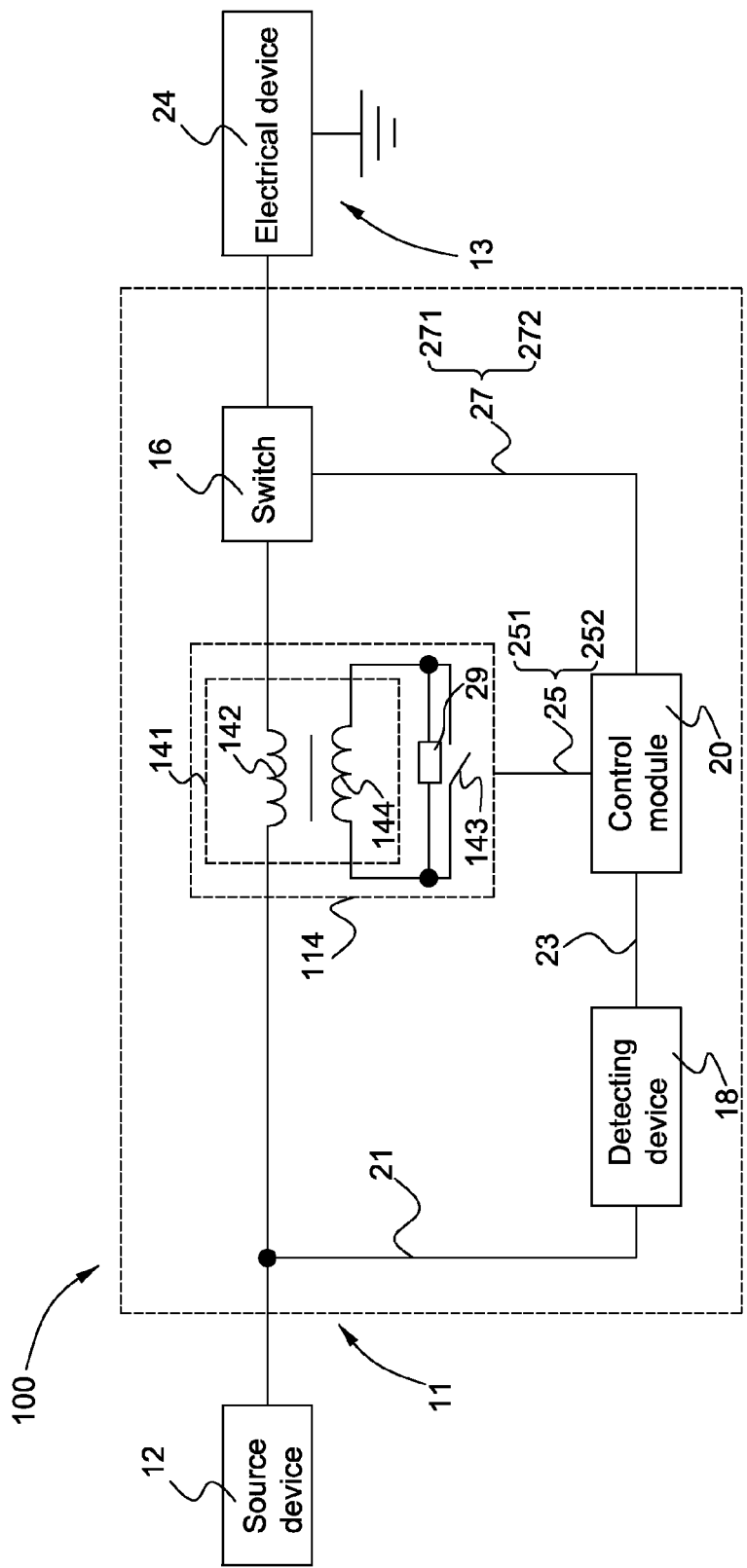
FIG. 2 is a schematic diagram of a protection system illustrating a detailed form of an inductive device shown in FIG. 1 in accordance with an embodiment of the present invention.

In the embodiment of FIG. 2, the inductive device 14 is coupled in series with the switch 16. The detecting device 18 has a fault detection time, the switch 16 has a turn-off delay, and the protection system 10 is not able to totally turn off power to the electrical device 24 until after the fault detection time and the turn-off delay have elapsed. During the fault detection time and the turn-off delay, the fault current may increase very quickly and exceed the turn-off capability of the switch 16. In the embodiment of FIG. 2, the inductive device 14 is used to limit the di/dt rate of so as to make the protection system 10 controllable and repeatable.

The inductive device 14 is designed with a controllable inductance characteristic. More specifically, the inductive device 14 could be operated with different inductances according to the different commands provided from the control module 20. In some embodiments, the inductive device 14 may be operated with a first inductance according to a first command corresponding to the normal mode of the protection system 10 and a second inductance according to a second command corresponding to the fault mode of the protection system 10.

In some embodiments, the inductive device 14 may be operated with a continually changeable inductance from the first inductance to the second inductance when the protection system 10 is transitioning from the normal mode to the fault mode. Also, the inductive device 14 may be operated with a continually changeable inductance from the second inductance to the first inductance when the protection system 10 is transitioning from the fault mode back to the normal mode.

In the embodiment of FIG. 2, the detecting device 18 is coupled to the source device 12 for detecting one or more overcurrent faults occurring at the source side 11. In a more specific embodiment, the detecting device 18 may include any suitable current sensors or transducers such as a resistor, a hall-effect current sensor, and a fiber optic current sensor for measuring a current 21 at the source side 11.

In some embodiments, the detecting device 18 may be used to measure a magnitude of the current 21 at the source side 11 and for outputting a detected signal 23 indicating a detected magnitude of the current 21. In some embodiments the detecting device 18 may alternatively or additionally be configured to measure a rate of change of the current 21 at the source side 11 and outputting the detected signal 23 indicating a detected rate of change of the current 21. The detecting device 18 is further coupled with the control module 20 for supplying the detected signal 23 to the control module 20.

The control module 20 is in electrical communication with at least the detecting device 18, the inductive device 14, and the switch 16 for providing control signals 25 and switching signals 27 to the inductive device 14 and the switch 16 respectively. In some embodiments, the control module 20 may include any suitable programmable circuits or devices such as a digital signal processor (DSP), a field programmable gate array (FPGA), a programmable logic controller (PLC), and an application specific integrated circuit (ASIC). In some embodiments, the control module 20 may be implemented in the form of hardware, software, or a combination of hardware and software. Specific details as to how the control signals 25 and the switching signals 27 are generated by the control module 20 will be described as below.

In some embodiments, the detected signal 23 may be compared with a predetermined current value by the control module 20 to determine whether one or more faults are occurring at the source side 11. In some embodiments, optionally or additionally, the detected signal 23 may be compared with a predetermined value of a rate of change of current to determine whether one or more faults are occurring at the source side 11. The control module 20 outputs the control signals 25 and the switching signals 27 according to the comparison results. In some embodiments, the control signals 25 include a first control signal 251 and a second control signal 252. The switching signals 27 include a turn-on switching signal 271 and a turn-off switching signal 272.

In some embodiments, when the detected signal 23 defined by the detected magnitude of the current 21 is smaller than the predetermined current value or the detected signal 23 defined by the detected rate of change of the current 21 is smaller than the predetermined value of rate of change of the current, the electrical device 24 is determined to be operated in a normal mode or no overcurrent fault is occurring at the source side 11, and the control module 20 provides the first control signal 251 in this case for operating the inductive device 14 with a first inductance. Meanwhile, following the normal mode determination, the control module 20 also provides the turn-on switching signal 271 in this case for turning on the switch 16.

Otherwise, when the detected signal 23 defined by the detected magnitude of the current 21 is equal to or larger than the predetermined current value or the detected signal 23 defined by the detected rate of change of the current 21 is equal to or larger than the predetermined value of rate of change of the current, the electrical device 24 is determined to be operated in a fault mode or at least one overcurrent fault is occurring at the source side 11, and the control module 20 provides the second control signal 252 for operating the inductive device 14 with a second inductance. Meanwhile, following the fault mode determination, the control module 20 also provides the turn-off switching signal 272 for turning off the switch 16.

During normal operation, when no overcurrent fault at the source side 11 is detected by the detecting device 18, the switch 16 is turned on according to the turn-on switching signal 271 provided from the control module 20. Because the inductive device 14 is controlled to be operated with a first inductance (e.g., a low inductance) according to the first control signal 251 provided from the control module 20, electrical current can be successfully delivered from the source device 12 to the electrical device 24 via the inductive device 14 and switch 16 to maintain normal operation.

During fault operation, when at least one overcurrent fault at the source side 11 is detected by the detecting device 18, the switch 16 is turned off according to the turn-off switching signal 272 provided from the control module 20. Because the inductive device 14 is controlled to be operated with a second inductance (e.g., a large inductance) according to the second control signal 252 provided from the control module 20, fault current applied to the switch 16 is prevented from being changed rapidly. Therefore, the switch 16 can be opened or tripped in a safe manner to isolate the electric device 24 from the fault area.

FIGS. 2 to 3 and FIGS. 5 to 6 show several detailed embodiments of the inductive device 14 as is shown in FIG. 1. These embodiments are similar to the protection system 10 shown in FIG. 1. For example, the protection systems shown in FIGS. 2 to 3 and FIGS. 5 to 6 may similarly include the control module 20, the switch 16, and the detecting device 18. Thus, detailed descriptions about the control module 20, the switch 16, and the detecting device 18 are omitted herein. Although the inductive devices in these embodiments are designed with different structures, all the inductive devices include the controllable inductance characteristics as described above. How the inductive device in each embodiment works will be described by the following illustration.

FIG. 2 is a schematic diagram of a protection system 100 with a mutual inductor with magnetic core 141 being used in the inductive device 14 as shown in FIG. 1 in accordance with an exemplary embodiment of the present invention. As is shown in FIG. 2, the mutual inductor with magnetic core 141 includes a primary winding 142 and a secondary winding 144. The mutual inductor with magnetic core 141 has a feature that the inductance of the primary winding 142 has the same changeable trend with the inductance of the secondary winding 144. Thus the inductance of the primary winding 142 can be controlled by changing the inductance of the secondary winding 144 with suitable circuits.

The primary winding 142 is coupled in series with the switch 16. The secondary winding 144 is coupled in series with at least one switching device 143 (e.g., an IGBT). Although not illustrated, in some embodiments, two or more switching devices 143 may be coupled in series with the secondary winding 144 for high voltage rating. The at least one switching device 143 is electrically coupled to the control module 20. The at least one switching device 143 can be turned on and off according to the control signals 25 provided from the control module 20.

In this illustrated embodiment, a snubber circuit 29 may be coupled in parallel with the at least one switching device 143. When the secondary winding 144 is open circuited, energy may be stored in the secondary winding 144. In this situation, the snubber circuit 29 can form a closed circuit loop with the secondary winding 144 to allow the energy stored in the secondary winding 144 to be released through the circuit loop. The snubber circuit 29 may include any suitable components such as voltage-sensitive components, resistors, and capacitors.

In the normal mode, the first control signal or a turn-on control signal 251 is supplied to the at least one switching device 143 to turn on the at least one switching device 143. In this situation, the secondary winding 144 is short circuited with a substantially zero inductance and the primary winding 142 is controlled to be operated with a substantially zero inductance. In some embodiments, the secondary winding 144 may be short circuited with a leakage inductance and the primary winding 142 is controlled to be operated with another leakage inductance or low inductance. As a result, the mutual inductor with magnetic core 141 is operated with the first inductance.

In this embodiment, in the normal mode, both of the primary winding 142 of the mutual inductor with magnetic core 141 and the switched-on switch 16 conduct the normal current provided from the source device 12 to the electrical device 24. The protection system 100 is configured to be operated as a conductor so as to have little impact on the operation of the electrical device 24.

In the fault mode, the second control signal or a turn-off control signal 252 is supplied to the at least one switching device 143 to turn off the at least one switching device 143. In this situation, the secondary winding 144 is open circuited with a maximum inductance and the primary winding 142 is controlled to be operated with another maximum inductance. As a result, the mutual inductor with magnetic core 141 is operated with the second inductance.

In this embodiment, in the fault mode, the electrical device 24 is interrupted by the protection system 10, more specifically, by opening or tripping the switched-on switch 16 in a safe manner with a limited fault current due to the maximum inductance of the primary winding 142 of the mutual inductor with magnetic core 141.

Figure 3:
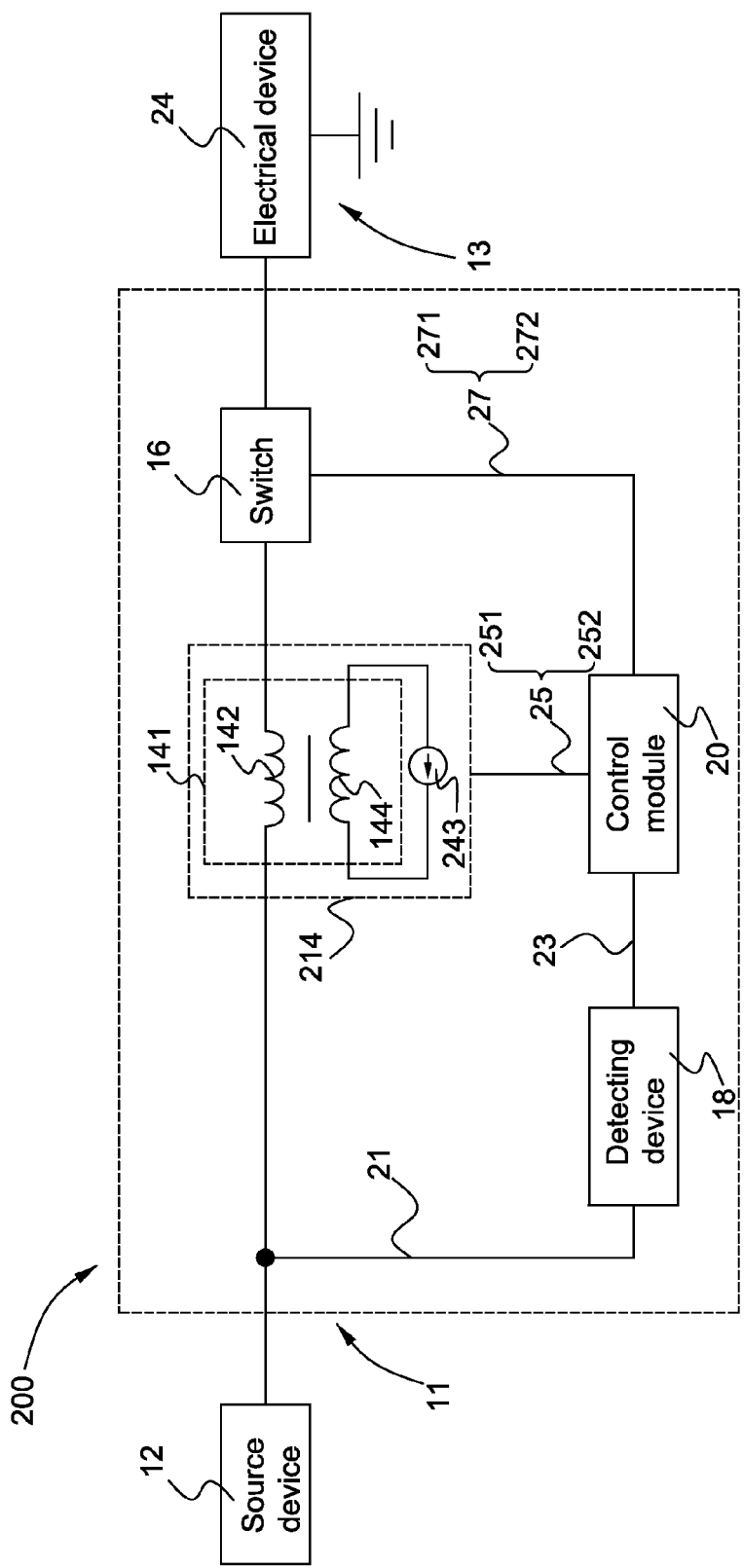
FIG. 3 is a schematic diagram of a protection system illustrating a detailed form of an inductive device shown in FIG. 1 in accordance with an embodiment of the present invention.

FIG. 3 is a schematic diagram of a protection system 200 with a mutual inductor with magnetic core 141 being used in the inductive device 14 shown in FIG. 1 in accordance with another exemplary embodiment of the present invention. The inductive device 214 is similar to the inductive device 114 shown in FIG. 2 and includes the mutual inductor with magnetic core 141. The primary winding 142 is still coupled in series with the switch 16. However, the secondary winding 144 is coupled in series with a bias current circuit 243. The bias current circuit 243 is electrically coupled to the control module 20.

Figure 4:
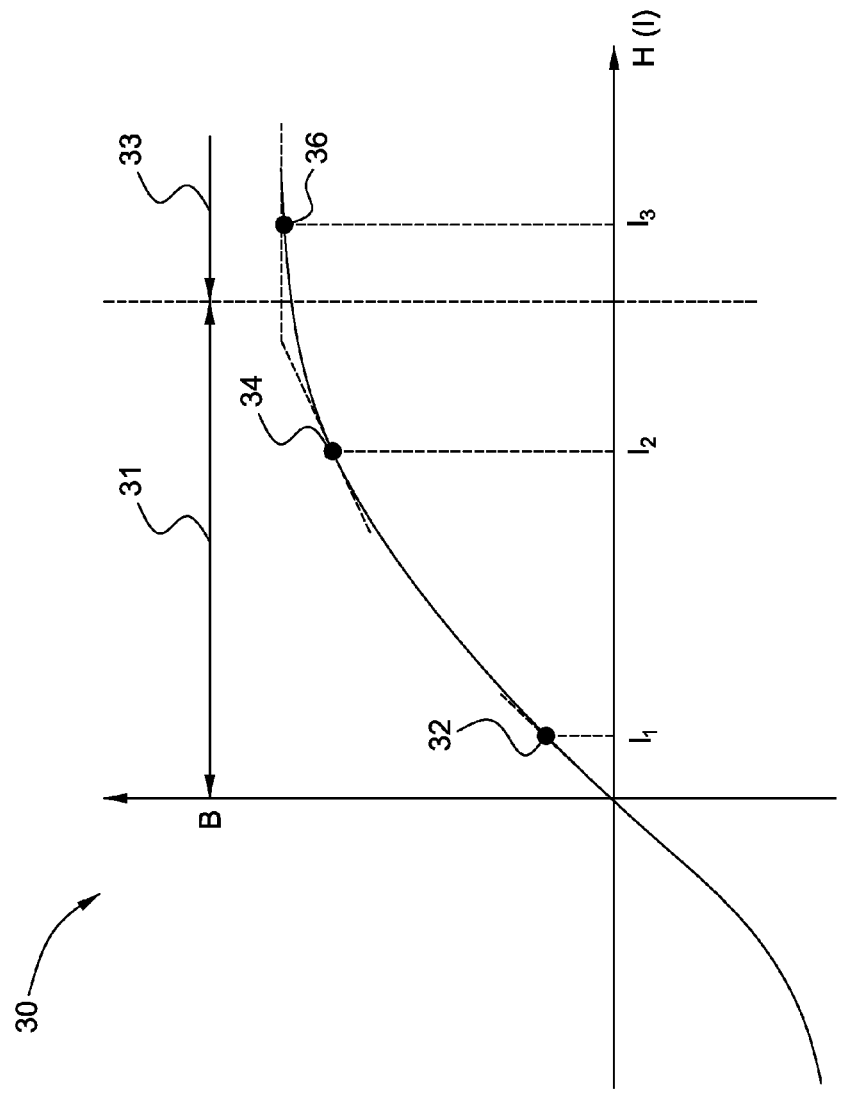
FIG. 4 is a hysteresis curve used in FIG. 3 in accordance with an embodiment of the present invention.

According to a hysteresis curve 30 shown in FIG. 4, the magnetic core with magnetic materials has a feature of non-saturation and saturation. The bias current circuit 243 is controlled to provide different currents to control the flux level in the magnetic core so that the inductance will be changed corresponding to the control signals 25. For example, when the magnetic core is operated in a saturation area 33, a larger current $I_3$ is provided by the bias current circuit 243 and the mutual inductor with magnetic core 141 may be operated in an operation point 36 with a substantially zero inductance. When the magnetic core is operated in a non-saturation area 31, smaller current $I_1$, $I_2$ are provided by the bias current circuit 243, the magnetic core is operated in a nonlinear area and the mutual inductor with magnetic core 141 may be operated in operation points 32, 34 with higher inductances (i.e., the inductance in the operation point 32 is higher than the inductance in the operation point 34).

More specifically, in the normal mode, the first control signal 251 is supplied to the bias current circuit 243, the bias current circuit 243 is controlled to provide a first current to allow the mutual inductor with magnetic core 141 to be operated with the first inductance. In this embodiment, both of the primary winding 142 of the mutual inductor with magnetic core 141 and the switched-on switch 16 conduct the normal current provided from the source device 12 to the electrical device 24. The protection system 200 is configured to be operated as a conductor so as to have little impact on the operation of the electrical device 24.

In the fault mode, the second control signal 252 is supplied to the bias current circuit 243, the bias current circuit 243 is controlled to provide a second current to allow the mutual inductor with magnetic core 141 to be operated with the second inductance (e.g., a higher inductance). In this embodiment, the electrical device 24 is interrupted by the protection system 200, more specifically, by opening or tripping the switched-on switch 16 in a safe manner with a limited fault current due to the second inductance of the primary winding 142 of the mutual inductor with magnetic core 141.

More specifically, when the left terminal of the primary winding 142 and the left terminal of the secondary winding 144 are the dotted terminals, in the normal mode, the first current in the bias current circuit 243 flows into the left terminal of the secondary winding 144 to reduce the inductance of the secondary winding 144. In this case, the first inductance of the primary winding 142 is a lower value. In the fault mode, the second current in the bias current circuit 243 flows out of the left terminal of the secondary winding 144 to increase the inductance of the secondary winding 144 continuously. Thus, the second inductance of the primary winding 142 is a higher value.

When the right terminal of the primary winding 142 and the left terminal of the secondary winding 144 are the dotted terminals, in the normal mode, the first current in the bias current circuit 243 flows out of the left terminal of the secondary winding 144 to reduce the inductance of the secondary winding 144. So the first inductance of the primary winding 142 is a smaller value. In the fault mode, the second current in the bias current circuit 243 flows into the left terminal of the secondary winding 144 to increase the inductance of the secondary winding 144 continuously. So the second inductance of the primary winding 142 is a higher value.

Figure 5:
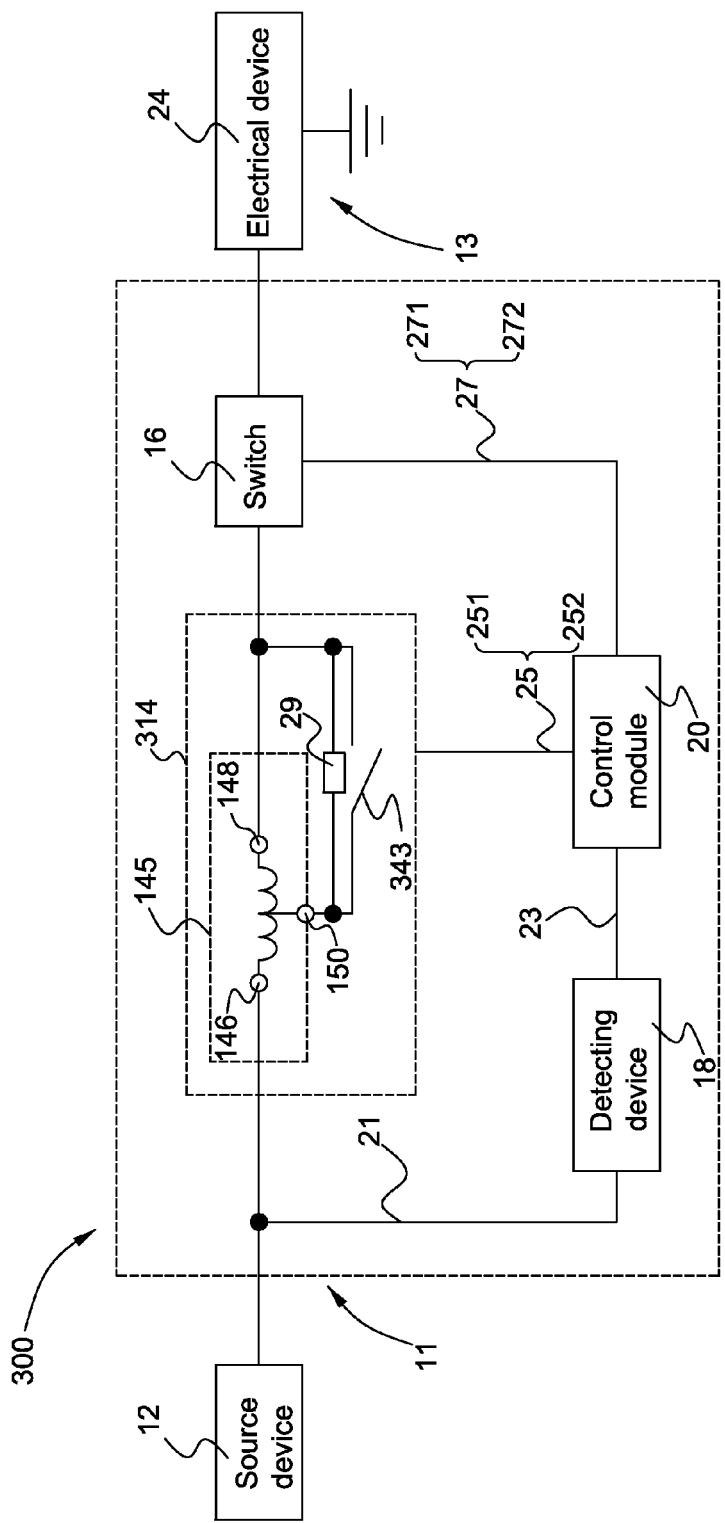
FIG. 5 is a schematic diagram of a protection system illustrating a detailed form of an inductive device shown in FIG. 1 in accordance with an embodiment of the present invention.

FIG. 5 is a schematic diagram of a protection system 300 with an inductor 145 being used in the inductive device 14 shown in FIG. 1 in accordance with an exemplary embodiment of the present invention. As is shown in FIG. 5, the inductor 145 includes a first terminal 146, a second terminal 148, and a third terminal 150. The inductor 145 is coupled between the source device 12 and the electrical device 24 via the first terminal 146 and the second terminal 148. At least one switching device 343 is coupled between the third terminal 150 and at least one of the first terminal 146 and the second terminal 148. In the illustrated embodiment, a snubber circuit 29 may be coupled in parallel with the at least one switching device 343 to avoid a voltage and/or current stress on the inductor 145 during commutation.

In the normal mode, the first control signal or a turn-on control signal 251 is supplied to the at least one switching device 343 to turn on the at least one switching device 343, so that the part of the inductor 145 between the second terminal 148 and the first or third terminal (shown as third terminal 150 in FIG. 5) is short circuited by the at least one switching device 343. The part of the inductor 145 between the first terminal 146 and the third terminal 150 effects in the protection system 300. The inductor 145 is controlled to be operated with an inductance between the first terminal 146 and the third terminal 150 indicating the first inductance.

In this embodiment, in the normal mode, both of the inductor 145 (e.g., the part of the inductor 145 between the first terminal 146 and the third terminal 150) and the switched-on switch 16 conduct the current provided from the source device 12 to the electrical device 24. The protection system 300 is configured to be operated as a conductor so as to have little impact on the operation of the electrical device 24.

In the fault mode, the second control signal or a turn-off control signal 252 is supplied to the at least one switching device 343, the at least one switching device 343 is turned off so that the whole of the inductor 145 effects in the protection system 300. The inductor 145 is controlled to be operated with a maximum inductance indicating the second inductance.

In this embodiment, in the fault mode, the electrical device 24 is isolated from the source device 12 by operating the protection system 300, more specifically, by opening or tripping the switched-on switch 16 in a safe manner with a limited fault current due to the second inductance of the inductor 145.

Figure 6:
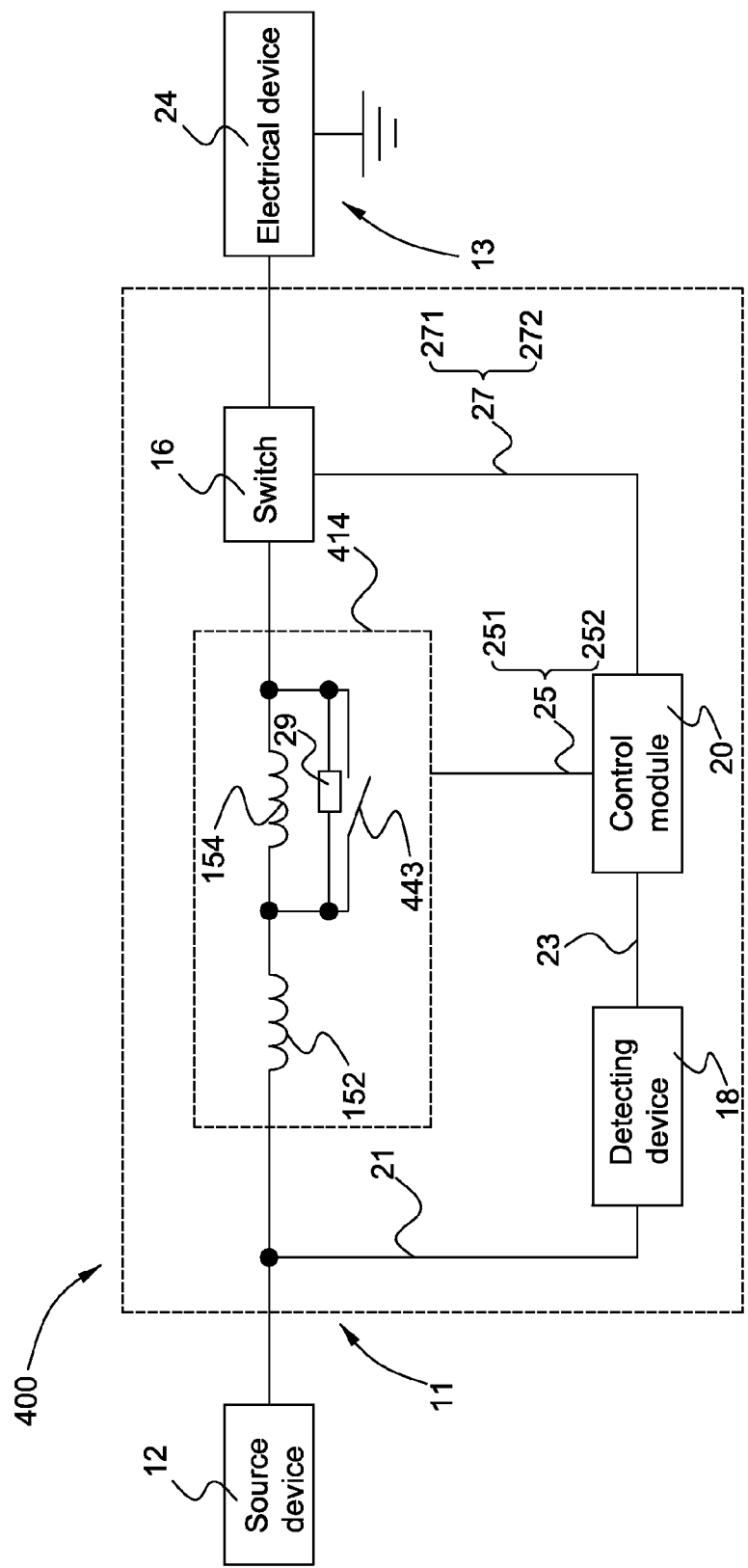
FIG. 6 is a schematic diagram of a protection system illustrating a detailed form of an inductive device shown in FIG. 1 in accordance with an embodiment of the present invention.

FIG. 6 is a schematic diagram of a protection system 400 with at least two inductors being used in the inductive device 14 shown in FIG. 1 in accordance with an exemplary embodiment of the present invention. As is shown in FIG. 6, a first inductor 152 and a second inductor 154 coupled in series with the first inductor 152 are used in an inductive device 414. The first inductor 152 and the second inductor 154 are coupled between the source device 12 and the electrical device 24. At least one switching device 443 is coupled in parallel with at least one of the first inductor 152 and the second inductor 154. In some embodiments, more than two inductors are used in the inductive device 414. More specifically, in the illustrated embodiment, the second inductor 154 is configured to have a larger inductance than the first inductor 152. A snubber circuit 29 is coupled in parallel with the at least one switching device 443 to avoid a voltage and/or current stress on the second inductor 154 during commutation.

In the normal mode, the first control signal or a turn-on control signal 251 is supplied to the at least one switching device 443 to turn on the at least one switching device 443, so that the second inductor 154 is short circuited by the at least one switching device 443. In this manner, the first inductor 152 and the second inductor 154 are controlled to be operated with an inductance of the first inductor 152 indicating the first inductance.

In this embodiment, in the normal mode, both of the first inductor 152 and the switched-on switch 16 conduct the current provided from the source device 12 to the electrical device 24. The protection system 400 is configured to be operated as a conductor so as to have little impact on the operation of the electrical device 24.

In the fault mode, the second control signal or a turn-off control signal 252 is supplied to the at least one switching device 443 to turn off the at least one switching device 443, so that both of the first inductor 152 and the second inductor 154 effect the protection system 400. The first inductor 152 and the second inductor 154 are controlled to be operated with a maximum inductance of the sum of the first inductor 152 and the second inductor 154 indicating the second inductance.

In this embodiment, in the fault mode, the electrical device 24 is interrupted by the protection system 400, more specifically, by opening or tripping the switched-on switch 16 in a safe manner with a limited fault current due to the increased inductance of the first inductor 152 and the second inductor 154.

Figure 7:
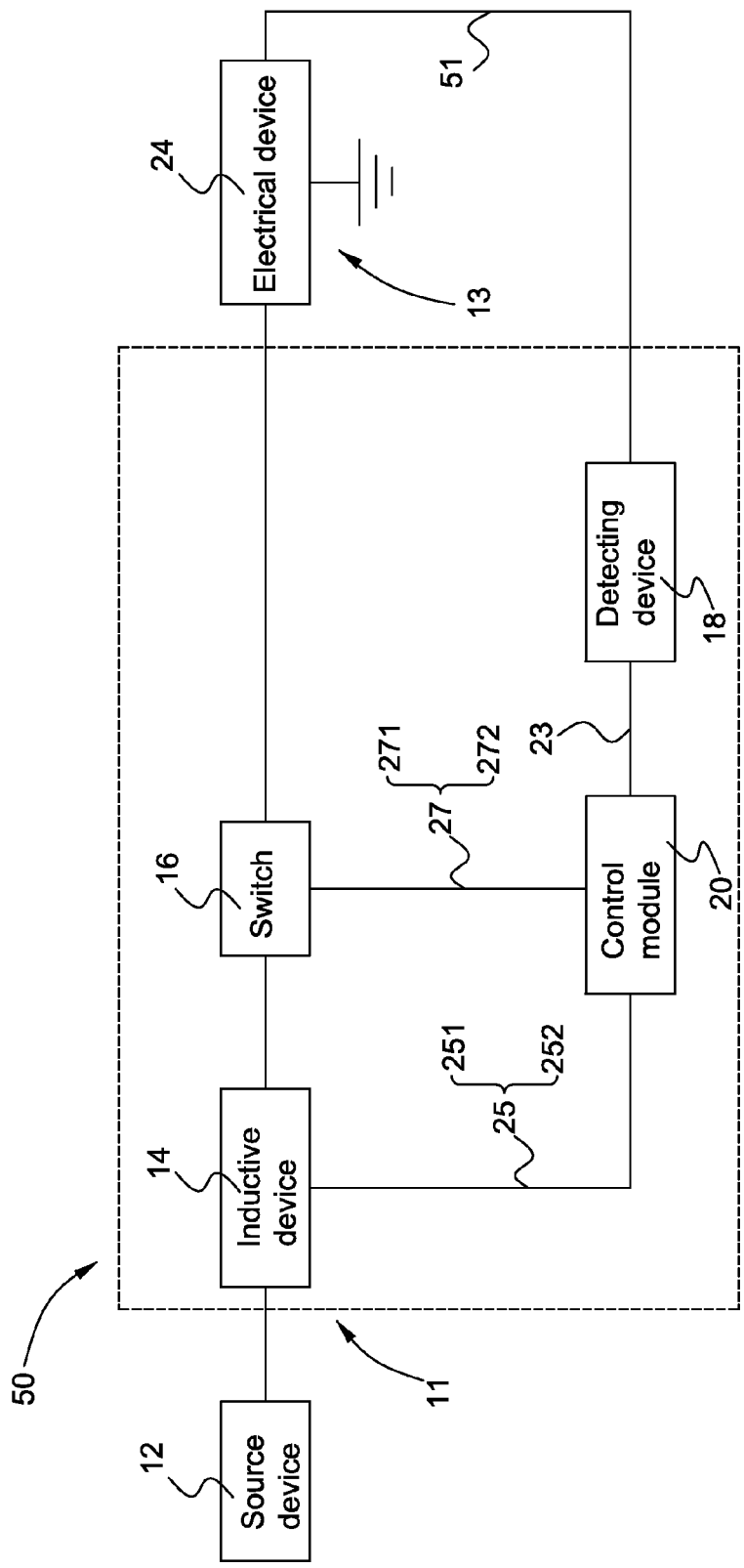
FIG. 7 is a block diagram of a protection system in accordance with an embodiment of the present invention.

FIG. 7 is a block diagram of a protection system 50 in accordance with another exemplary embodiment of the present invention. The protection system 50 is similar to the protection system 10 shown in FIG. 1 and includes the control module 20, the switch 16, the inductive device 14 and the detecting device 18. Thus, detailed description about the control module 20, the switch 16, the inductive device 14, and the detecting device 18 are omitted herein. More specifically, in this embodiment, the protection system 50 is configured to protect the electrical device 24 against one or more faults such as an overcurrent fault occurring in the load side 13.

In some embodiments, the detecting device 18 is coupled with the electrical device 24 for detecting one or more overcurrent faults occurring at the load side 13. More specifically, the detecting device 18 may be used to measure a current 51 at the load side 13. In some embodiments, the detecting device 18 may be used to measure a magnitude of the current 51 at the load side 13 and for outputting a detected signal 23 indicating a detected magnitude of the current 51. In some embodiments, optionally or additionally, the detecting device 18 may be configured to measure a rate of change of the current 51 at the load side 13 and outputting the detected signal 23 indicating a detected rate of change of the current 51. The detecting device 18 is further coupled with the control module 20 for supplying the detected signal 23 to the control module 20.

In some embodiments, the detected signal 23 may be compared with a predetermined current value by the control module 20 to determine whether one or more faults are occurring at the load side 13. In some embodiments, optionally or additionally, the detected signal 23 may be compared with a predetermined value of a rate of change of current to determine whether one or more faults are occurring at the load side 13. The control module 20 outputs the control signals 25 and the switching signals 27 according to the comparison results.

In some embodiments, when the detected signal 23 defined by the detected magnitude of the current 51 is smaller than the predetermined current value or the detected signal 23 defined by the detected rate of change of the current 51 is smaller than the predetermined value of rate of change of the current, the electrical device 24 is determined to be operated in a normal mode or no overcurrent fault is occurring at the load side 13, and the control module 20 provides the first control signal 251 in this case for operating the inductive device 14 with a first inductance. Meanwhile, following the normal mode determination, the control module 20 also provides the turn-on switching signal 271 in this case for turning on the switch 16.

Otherwise, when the detected signal 23 defined by the detected magnitude of the current 51 is equal to or larger than the predetermined current value or the detected signal 23 defined by the detected rate of change of the current 51 is equal to or larger than the predetermined value of rate of change of the current, the electrical device 24 is determined to be operated in a fault mode or at least one overcurrent fault is occurring at the load side 13, and the control module 20 provides the second control signal 252 for operating the inductive device 14 with a second inductance. Meanwhile, following the fault mode determination, the control module 20 also provides the turn-off switching signal 272 for turning off the switch 16.

Figure 8:
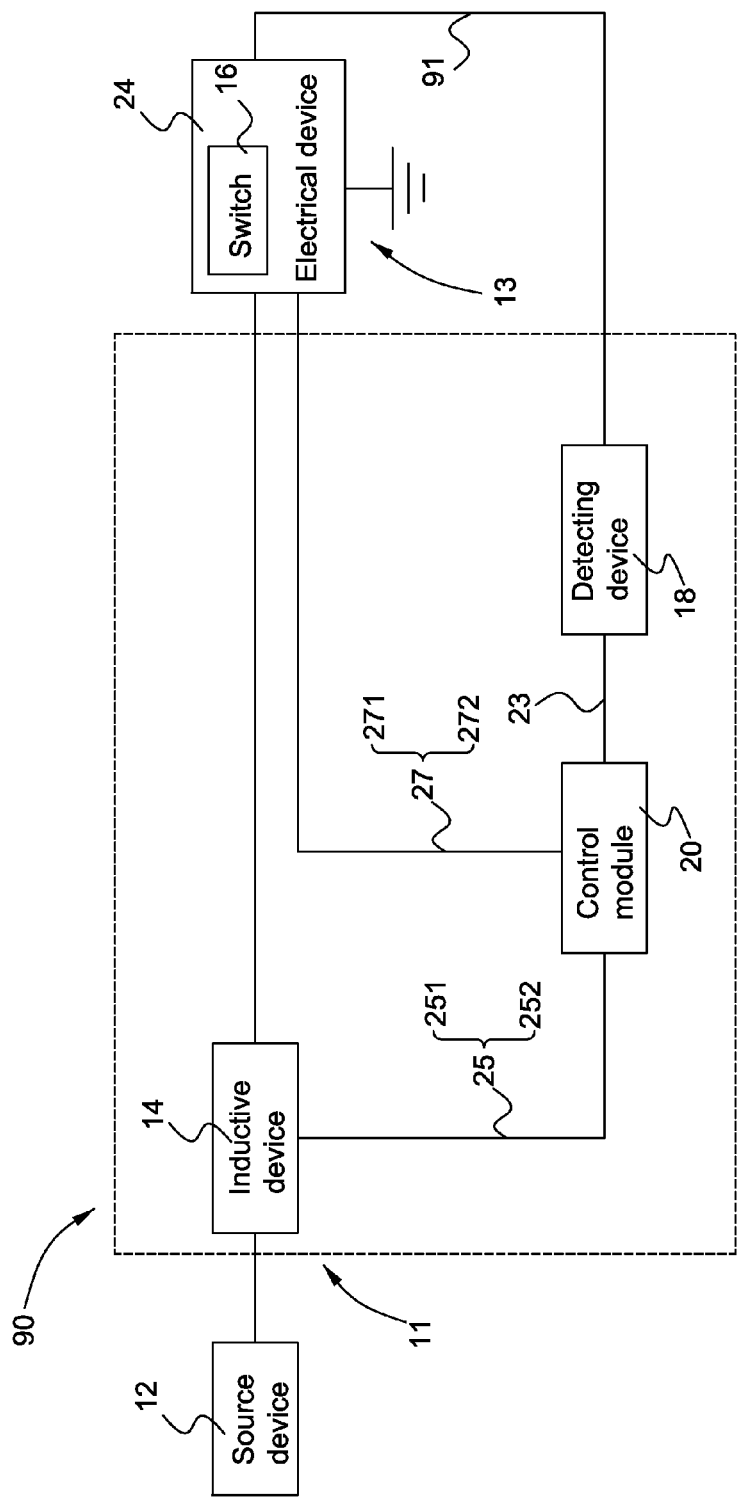
FIG. 8 is a block diagram of a protection system in accordance with another exemplary embodiment of the present invention.

FIG. 8 is a block diagram of a protection system 90 in accordance with another exemplary embodiment of the present invention. The protection system 90 is similar to the protection system 50 shown in FIG. 7 and includes the control module 20, the inductive device 14, and the detecting device 18. Thus, detailed descriptions about the control module 20, the inductive device 14 and the detecting device 18 are omitted herein. The electrical device 24 includes at least one switch 16, which is arranged as an internal component of the electrical device 24.

In the normal mode or when no overcurrent fault occurs in the electrical device 24, the turn-on switching signal 271 is supplied to the switch 16 to turn on the switch 16 and the first control signal 251 is supplied to the inductive device 14 to control the inductive device 14 to be operated with the first inductance. In this embodiment, the protection system 90 is configured to be operated as a conductor so as to have little impact on the operation of the electrical device 24.

In the fault mode or when at least one overcurrent fault occurs in the electrical device 24, the turn-off switching signal 272 is supplied to the switch 16 to turn-off the switch 16 and the second control signal 252 is supplied to the inductive device 14 to control the inductive device 14 to be operated with the second inductance. In this embodiment, the protection system 90 is used to isolate the fault area of the electrical device 24 from the fault current and the normal area of the electrical device 24 may continually work with a minor disturbance which may be brought by cutting off the fault area from the electrical device 24.

Figure 9:
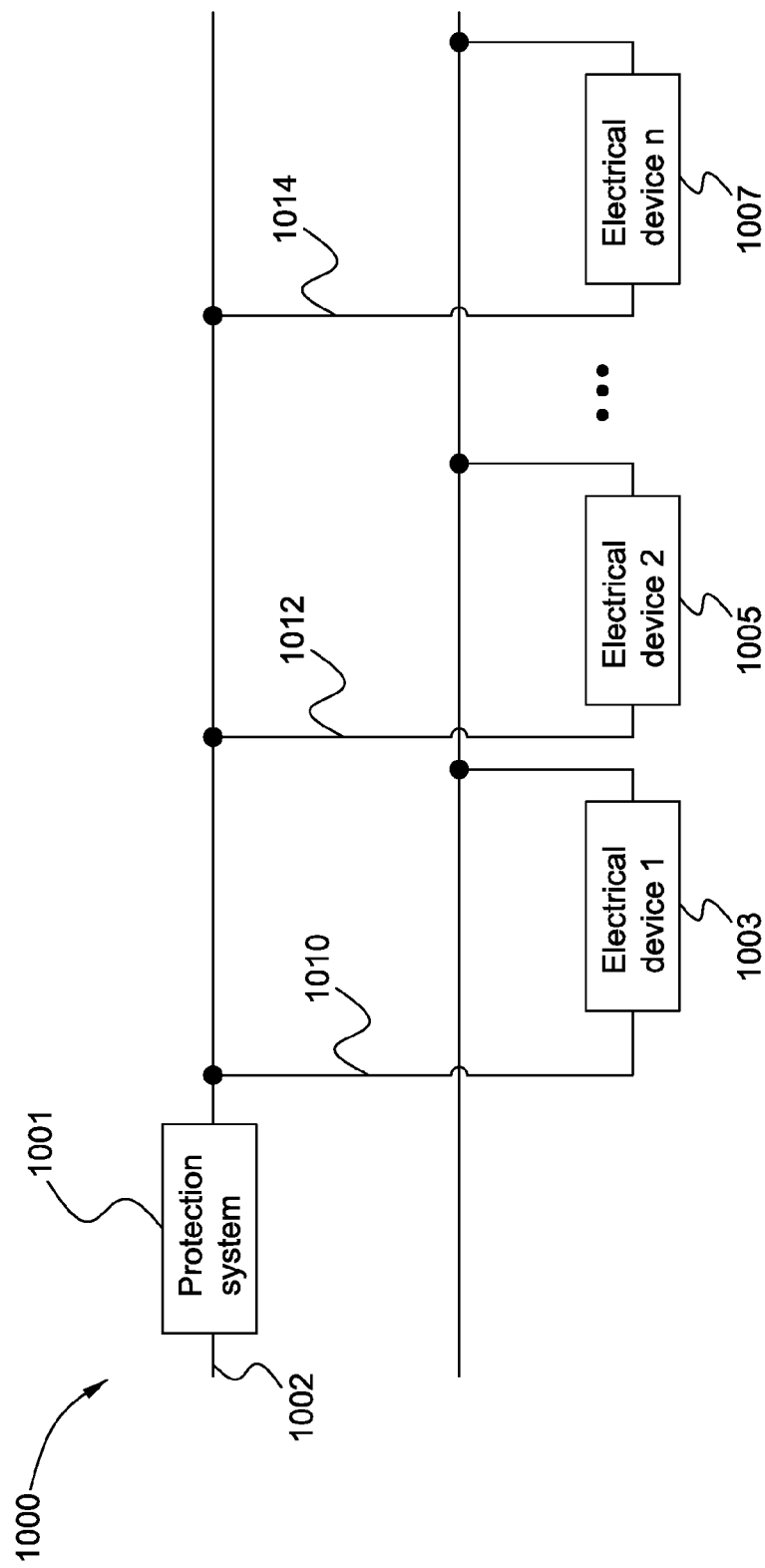
FIG. 9 is a block diagram of a circuit system using a protection system shown in FIG. 1 in accordance with an exemplary embodiment of the present invention.

FIG. 9 is a block diagram of a circuit system 1000 in accordance with an exemplary embodiment of the present invention. The circuit system 1000 includes a plurality of electrical devices 1003, 1005, 1007 and a protection system 1001. The electrical devices 1003, 1005, and 1007 may be coupled in parallel to a main DC bus 1002 via branch DC buses 1010, 1012, and 1014 respectively.

The protection system 1001 is coupled with the main DC bus 1002 to protect the electrical devices 1003, 1005, and 1007 against one or more fault occurring at the main DC bus 1002. In some embodiments, the protection system 1001 may include a switch which is arranged as an internal component of the protection system 1001 like the protection system 10 shown in FIG. 1 and the protection system 50 shown in FIG. 7.

In the normal mode or when no overcurrent fault occurs at the main DC bus 1002, the turn-on switching signal 271 is supplied to the switch 16 as shown in FIG. 1 to turn on the switch 16 and the first control signal 251 is supplied to the inductive device 14 as shown in FIG. 1 to control the inductive device 14 to be operated with a first inductance. In this embodiment, the protection system 1001 is configured to be operated as a conductor so as to have little impact on the operation of the electrical devices 1003, 1005, and 1007.

In the fault mode or when at least one overcurrent fault occurs at the main DC bus 1002, the electrical devices such as 1003, 1005, and 1007 are isolated from the main DC bus 1002 almost at the same time by the protection system 1001. More specifically, the turn-off switching signal 272 is supplied to the switch 16 as shown in FIG. 1 to turn off the switch 16 and the second control signal 252 is supplied to the inductive device 14 shown in FIG. 1 to control the inductive device 14 to be operated with a second inductance. In this embodiment, the switch 16 could be opened or tripped in a safe manner with a limited fault current due to a second inductance of the inductive device 14.

Figure 10:
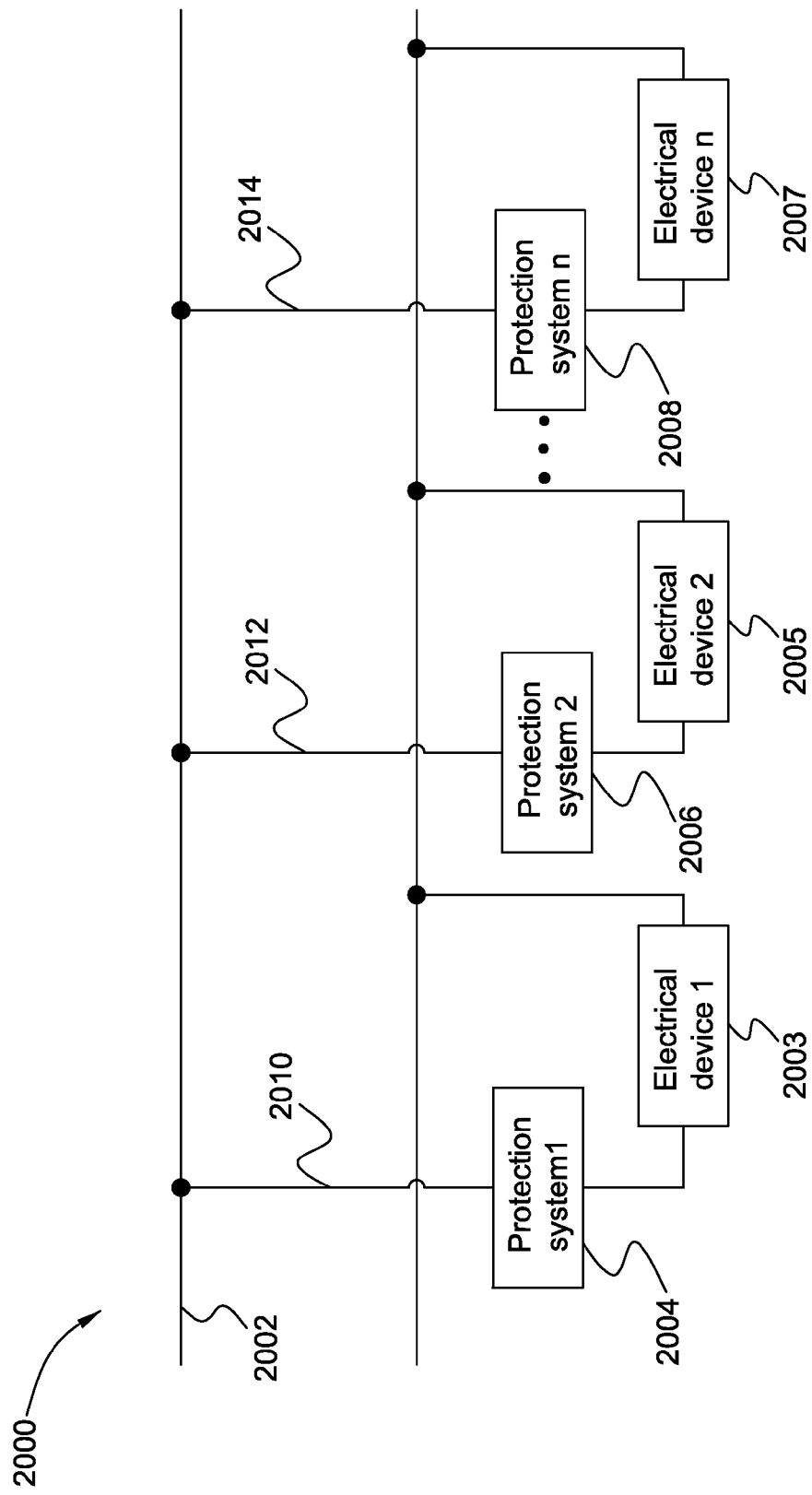
FIG. 10 is a block diagram of a circuit system using a protection system shown in FIG. 1 or 7 or 8 in accordance with another exemplary embodiment of the present invention.

FIG. 10 is a block diagram of a circuit system 2000 in accordance with another exemplary embodiment of the present invention. The circuit system 2000 includes a plurality of electrical devices 2003, 2005, and 2007, a plurality of protection systems 2004, 2006, and 2008. The electrical devices 2003, 2005, and 2007 may be coupled in parallel to a main DC bus 2002 via branch DC buses 2010, 2012, and 2014 respectively.

Each protection system is coupled in series with a corresponding electrical device in each branch DC bus to protect each electrical device against one or more fault occurring at each branch DC bus. For example, the protection system 2004 is coupled in series with the electrical device 2003. Both of the protection system 2004 and the electrical device 2003 are coupled to the main DC bus 2002 via the branch DC bus 2010.

In some embodiments, a switch is arranged as an internal component of the protection system 2004 like the protection system 10 shown in FIG. 1 and the protection system 50 shown in FIG. 7. In some embodiments, the switch is arranged as an internal component of the electrical device 2003 like the protection system 90 shown in FIG. 8.

In the normal mode or when no overcurrent fault occurs at the branch DC bus 2010, the turn-on switching signal 271 is supplied to the switch 16 to turn on the switch 16 and the first control signal 251 is supplied to the inductive device 14 as shown in FIG. 1 to control the inductive device 14 to be operated with a first inductance. In this embodiment, the protection system 2004 is configured to be operated as a conductor so as to have little impact on the operation of the electrical device 2003.

In the fault mode or when at least one overcurrent fault occurs at the branch DC bus 2010, the electrical device 2003 or the fault area of the electrical device 2003 will be isolated from the branch DC bus 2010 by the protection system 2004. More specifically, the turn-off switching signal 272 is supplied to the switch 16 to turn off the switch 16 and the second control signal 252 is supplied to the inductive device 14 shown in FIG. 1 to control the inductive device 14 to be operated with a second inductance. In this embodiment, the switch 16 could be opened or tripped in a safe manner with a limited fault current due to a second inductance of the inductive device 14.

By using the protection system 2004, the fault branch DC bus 2010 may bring minor disturbance to the main DC bus 2002 when the fault branch DC bus 2010 is isolated from the main DC bus 2002. That is, the at least one overcurrent fault in the branch DC bus 2010 will have little impact on the operation of the other electrical devices (e.g., the electrical devices 2005, 2007).

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this present invention. It is, therefore, to be understood that the appended claims are intended to cover all such modifications and changes as fall within the true spirit of the present invention.

Further, as will be understood by those familiar with the art, the present invention may be embodied in other specific forms without depending from the spirit or essential characteristics thereof. Accordingly, the disclosures and descriptions herein are intended to be illustrative, but not limiting, of the scope of the invention which is set forth in the following claims.

What is claimed is:

1. A protection system, comprising:
    a control module for providing control signals and switching signals based at least in part on a detected signal measured by a detecting device, wherein the control signals comprise a first control signal corresponding to a normal mode and a second control signal corresponding to a fault mode;
    a switch for being switched on and off according to the switching signals; and
    an inductive device coupled with the switch, wherein the inductive device is controlled to be operated with a first inductance in response to the first control signal provided from the control module and a second inductance in response to the second control signal provided from the control module.

2. The protection system of claim 1, wherein the detected signal measured by the detecting device comprises a current signal, and wherein the control module is used to determine the normal mode and the fault mode by comparing the current signal with a predetermined current value.

3. The protection system of claim 1, wherein the detected signal measured by the detecting device comprises a rate of change of current, and wherein the control module is used to determine the normal mode and the fault mode by comparing the rate of change of current with a predetermined value of a rate of change of current.

4. The protection system of claim 1, wherein the detecting device is coupled to receive the detected signal from at least one of a source side and a load side of the protection system.

5. The protection system of claim 1, wherein the inductive device comprises:
   a mutual inductor with magnetic core comprising a primary winding coupled with the switch and a secondary winding; and
   at least one switching device coupled in series with the secondary winding of the mutual inductor with magnetic core, wherein:
      the at least one switching device is turned on in response to the first control signal; and
      the at least one switching device is turned off in response to the second control signal; and
   a snubber circuit coupled with the at least one switching device.

6. The protection system of claim 1, wherein the inductive device comprises:
   a mutual inductor with magnetic core comprising a primary winding coupled with the switch and a secondary winding; and
   a bias current circuit coupled in series with the secondary winding of the mutual inductor with magnetic core, wherein:
      the bias current circuit is configured to provide a first current in response to the first control signal; and
      the bias current circuit is configured to provide a second current in response to the second control signal.

7. The protection system of claim 1, wherein the inductive device comprises:
   an inductor comprising a first terminal, a second terminal, and a third terminal, wherein the inductor is coupled between a source device and an electrical device via the first terminal and the second terminal; and
   at least one switching device coupled between the third terminal and at least one of the first terminal and the second terminal of the inductor, wherein:
      the at least one switching device is turned on in response to the first control signal; and
      the at least one switching device is turned off in response to the second control signal; and
   a snubber circuit coupled with the at least one switching device.

8. The protection system of claim 1, wherein the inductive device comprises:
   a first inductor and a second inductor coupled in series with the switch; and
   at least one switching device coupled in parallel with at least one of the first inductor and the second inductor, wherein:
      the at least one switching device is turned on in response to the first control signal; and
      the at least one switching device is turned off in response to the second control signal; and
   a snubber circuit coupled with the at least one switching device.

9. A method for operating a protection system, comprising:
   providing a first control signal to an inductive device of the protection system to allow the inductive device to be operated with a first inductance in a normal mode; and
   providing a second control signal to the inductive device of the protection system to allow the inductive device to be operated with a second inductance in a fault mode.

10. The method for operating the protection system of claim 9, comprising determining the normal mode and the fault mode by comparing a detected signal measured by a detecting device with a predetermined current value, wherein the detected signal comprises a current.

11. The method for operating the protection system of claim 9, comprising determining the normal mode and the fault mode by comparing the detected signal measured by the detecting device with a predetermined value of a rate of change of current, wherein the detected signal comprises a rate of change of current.

12. The method for operating the protection system of claim 9, comprising measuring the detected signal from at least one of a source side and a load side of the protection system.

13. The method for operating the protection system of claim 9, wherein the first control signal and the second control signal are provided in a manner to allow the first inductance of the inductive device to be continuously changed to the second inductance.

14. A circuit system, comprising:
   an electrical device;
   a switch; and
   a protection system for the electrical device, comprising:
      a control module for providing control signals and switching signals based at least in part on a detected signal measured by a detecting device, wherein the control signals comprise a first control signal corresponding to a normal mode and a second control signal corresponding to a fault mode; and
      an inductive device coupled with the switch, wherein the inductive device is controlled to be operated with a first inductance in response to the first control signal provided from the control module and a second inductance in response to the second control signal provided from the control module; and
   wherein the switch is configured for being switched on and off according to the switching signals.

15. The circuit system of claim 14, comprising a main DC bus, wherein the protection system is coupled in the main DC bus and configured to protect the electrical device against at least one fault occurring at the main DC bus.

16. The circuit system of claim 14, comprising a branch DC bus, wherein the protection system is coupled in the branch DC bus and configured to protect the electrical device against at least one fault occurring at the branch DC bus.

17. The circuit system of claim 14, wherein the switch is arranged as a component of the protection system.

18. The circuit system of claim 14, wherein the switch is arranged as a component of the electrical device.

19. The circuit system of claim 18, wherein the switch is used to insulate at least the electrical device and a fault part of the electrical device.

20. The circuit system of claim 14, wherein the electrical device comprises at least one of a DC electrical device and an AC electrical device.

* * * * *